US007634531B2

(12) United States Patent
Abdolsalehi (10) Patent No.: US 7,634,531 B2
(45) Date of Patent: Dec. 15, 2009

(54) INTERACTIVE INTERNET BROWSER BASED MEDIA BROADCAST

(75) Inventor: Ali Abdolsalehi, 7830 Crescent Ave., Buena Park, CA (US) 90620

(73) Assignee: Ali Abdolsalehi, Beverly Hills, CA (US)

( * ) Notice: Subject to any disclaimer, the term of this patent is extended or adjusted under 35 U.S.C. 154(b) by 840 days.

(21) Appl. No.: 10/057,151

(22) Filed: Jan. 23, 2002

(65) Prior Publication Data

US 2003/0158957 A1      Aug. 21, 2003

(51) Int. Cl.
*G06F 15/16* (2006.01)
(52) U.S. Cl. ........................................ 709/203; 709/217
(58) Field of Classification Search ......... 709/201–203, 709/217–219, 223–237
See application file for complete search history.

(56) References Cited

U.S. PATENT DOCUMENTS

| 5,844,600 | A  | * | 12/1998 | Kerr ........................ 348/14.12 |
| 6,130,880 | A  | * | 10/2000 | Naudus et al. ............... 370/235 |
| 6,345,239 | B1 |   | 2/2002  | Bowman-Amuah ............ 703/6 |
| 6,789,120 | B1 | * | 9/2004  | Lee et al. .................... 709/227 |
| 6,801,619 | B1 | * | 10/2004 | Bae ........................ 379/266.01 |
| 6,834,048 | B1 | * | 12/2004 | Cho et al. ................... 370/356 |
| 7,043,749 | B1 | * | 5/2006  | Davies ....................... 725/120 |
| 2001/0052012 | A1 | * | 12/2001 | Rinne et al. ................. 709/224 |
| 2002/0002586 | A1 | * | 1/2002  | Rafal et al. ................. 709/205 |
| 2002/0077900 | A1 | * | 6/2002  | Thompson et al. ............ 705/14 |
| 2002/0087592 | A1 | * | 7/2002  | Ghani ........................ 707/500 |
| 2002/0093948 | A1 | * | 7/2002  | Dertz et al. .................. 370/355 |
| 2002/0114274 | A1 | * | 8/2002  | Sturges et al. ............... 370/229 |
| 2002/0120760 | A1 | * | 8/2002  | Kimchi et al. .............. 709/230 |
| 2005/0002514 | A1 | * | 1/2005  | Shafiee et al. .......... 379/265.09 |

OTHER PUBLICATIONS

Applet Security Frequently Asked Questions, printed from the Dec. 19, 2000 archive of "http://java.sun.com/sfaq/".*

* cited by examiner

*Primary Examiner*—Yasin M Barqadle
(74) *Attorney, Agent, or Firm*—Liu & Liu (57) ABSTRACT

A method of providing one-way video transmission and corresponding interactive two-audio communication to remote recipients via a world wide computer network comprising the steps of creating a source digital video signal, broadcast transmitting the source digital video signal via an internet connection, transmitting a corresponding source digital audio signal a VoIP protocol, and transmitting a recipient audio signal to the source location via an Internet connection. A system for broadcast transmitting a one-way digital video signal and for transmitting and receiving a corresponding interactive two-way audio signal over an Internet connection comprises a broadcast digital video server for broadcast transmitting a source digital video signal, a VoIP audio server for transmitting a source digital audio signal over an Internet connection, and an Internet web page configured to display the transmitted source digital video and audio signal, the Internet web page further configured to receive and transmit a recipient digital audio signal from the recipient to the VoIP audio server.

18 Claims, 3 Drawing Sheets

INTERACTIVE INTERNET BROWSER BASED MEDIA BROADCAST

FIELD OF THE INVENTION

The present invention pertains to improved systems and methods for audio and visual broadcast via a world wide computer network.

BACKGROUND OF THE INVENTION

During the 1970's and 1980's, the defense industry encouraged and developed an interconnecting network of computers as a back up for transmitting data and messages in the event that established traditional methods of communication fails. University mainframe computers were networked in the original configurations, with many other sources being added as computers became cheaper and more prevalent. With a loose interconnection of computers hardwired or telephonically connected across the country, the defense experts reasoned that many alternative paths for message transmission would exist at any given time. In the event that one message path was lost, an alternative message path could be established and utilized in its place. Hence, it was the organized and non-centralized qualities of this communications system that made it appealing to the military as a backup communication medium. If any one computer or set of computers was attacked or disconnected, many other alternative paths could eventually be found and established.

This interconnection of computers has since been developed by universities and businesses into a worldwide network that is presently known as the Internet. The Internet, as configured today, is a publicly accessible digital data transmission network that is primarily composed of terrestrial communications facilities. Access to this worldwide network is relatively low cost and hence, it has become increasingly popular for such tasks as electronic mailing and Web page browsing. Both such functions are badge or file transfer oriented. Electronic mail, for instance, allows a user to compose a letter and transmit it over the Internet to an electronic destination. For one-way Internet transfers such as e-mail, it is relatively unimportant how long each file transfer takes as long as it is reasonable. Messages are routed, through no fixed path but rather, through various interconnected computers until they reached their destination. During heavy message low periods, messages will be held at various internal network computers until the pathways are cleared for new transactions. Accordingly Internet transmissions are effective for one-way transfers, but cannot be relied upon for time high priority applications.

Web pages are collections of data including text, audio, video, and interlaced computer programs. Each web page has a specific electronic site destination that can be accessed through a device known as a web server, and can be accessed by anyone through via Internet. Web page browsing allows a person to inspect the contents of a web page on a remote server to glean various information contained therein, including for instance product data, company backgrounds, and other such information which can be digitized. The remote server data is access by a local browser, and the information is displayed as text, graphics, audio, and video.

The web browsing process, therefore, is a two-way data communication between the browsing user, who has a specific electronic address or destination, and the web page, which also has a specific electronic destination. In this mode of operation, as opposed to electronic mail functions, responsiveness of the network is paramount since the user expects a quick response to each digital request. As such, each browsing user establishes a two-way data communication, which ties up an entire segment of bandwidth on the Internet system.

Recent developments on the Internet include telephone, videophone, conferencing and broadcasting applications. Each of these technologies places a similar real-time demand on the Internet. Real-time Internet communication involves a constant two-way throughput of data between the users, and the data must be received by each user nearly immediately after its transmission by the other user. However, the original design of the Internet did not anticipate such real-time data transmission requirements. As such, these new applications have serious technical hurdles to overcome in order to become viable.

Products, which place real-time demands on the Internet, will be aided by the introduction of an updated hardware interconnection configuration, or "backbone," which provides wider bandwidth transmission capabilities. For instance, the MCI backbone was recently upgraded to 622 megabytes per second. Regardless of such increased bandwidth, the interconnection configuration is comprised of various routers, which may still not be fast enough, and can therefore significantly degrade the overall end-to-end performance of both one-way, and particularly two-way, traffic on the Internet. Moreover, even with a bandwidth capability of 622 megabytes per second, the Internet backbone can maximally carry only the following amounts of data: 414—1.5 Mbs data streams; 4,859—128 Kbs data streams; 21597—28.8 Kbs data streams; or combinations thereof. While this is anticipated as being sufficient by various Internet providers, it is likely to quickly prove inadequate for near-future applications.

Internal networks, or Intranet sites, might also be used for data transfer and utilize the same technology as the Internet. Intranets, however, are privately owned and operated and are not accessible by the general public. Message and data traffic in such private networks is generally much lower than more crowded public networks. Intranets are typically much more expensive for connect time, and therefore any related increase in throughput comes at a significantly higher price to the user.

To maximize accessibility of certain data, broadcasts of radio shows, sporting events, and the like are currently provided via Internet connections whereby the broadcast is accessible through a specific web page connection. However, as detailed above, each web page connection requires a high throughput two-way connection through the standard Internet architecture. A given Internet backbone will be quickly overburdened with users if the entire set of potential broadcasters across world began to provide broadcast services via such web page connections. Such broadcast methods through the Internet have thereby proven to be ineffective given the two-way data throughput needed to access web pages and real-time data.

There is an enormous demand for the delivery of large amounts of content to a large number of listeners. The broadcast channels of today, such as radio and TV, can only deliver a small number of channels to a large number of listeners. Their delivery mechanism is well known to customers. The broadcaster transmits programs and the listener must "tune in" at the proper time and channel to receive the desired show.

For example, "on demand" systems have been attempted by the cable industry. Such systems attempt to transport the program or show from a central repository (server) to the user (client) in response to his/her request. To initiate the request, the user selects from a list of candidate programs and requests that the system deliver the selected program.

The foregoing "on demand" model of content delivery places two significant requirements on the delivery system. First, there should be a direct connection between each content storage device (server) and each listener (client). The phone system is an example of such a point-to-point interconnection system. Another example of such an interconnection system is the Internet, which is also largely based on the terrestrial telecommunications networks. Second, the server must be capable of delivering all the programs to the requesting clients at the time that which the client demands the programming.

With the advent of digital video products and services, such as Digital Satellite Service (DSS) and storage and retrieval of video streams on the Internet and, in particular, the World Wide Web, digital video signals are becoming ever present and drawing more attention in the marketplace. Because of limitations in digital signal storage capacity and in network and broadcast bandwidth limitations, compression of digital video signals has become paramount for digital video storage and transmission. As a result, many standards for compression and encoding of digital video signals have been promulgated. For example, the International Telecommunication Union (ITU) has promulgated the H.261 and H.263 standards for digital video encoding. Additionally, the International Standards Organization (ISO) has promulgated the Motion Picture Experts Group (MPEG), MPEG-1, and MPEG-2 standards for digital video encoding.

These standards specify with particularity the form of encoded digital video signals and how such signals are to be decoded for presentation to a viewer. However, significant discretion is left as to how the digital video signals are to be transformed from a native, uncompressed format to the specified encoded format. As a result, many different digital video signal encoders currently exist and many approaches are used to encode digital video signals with varying degrees of compression achieved.

In general, greater degrees of compression are achieved at the expense of video image signal loss and higher quality motion video signals are achieved at the expense of lesser degrees of compression and thus at the expense of greater bandwidth requirements. It is particularly difficult to balance image quality with available bandwidth when delivery bandwidth is limited. Such is the case in real-time motion video signal delivery such as video telephone applications and motion video on demand delivery systems. It is generally desirable to maximize the quality of the motion video signal as encoded without exceeding the available bandwidth of the transmission medium carrying the encoded motion video signal. If the available bandwidth is exceeded, some or all of the sequence of video images are lost and, therefore, so is the integrity of the motion video signal. If an encoded motion video signal errs on the side of conserving transmission medium bandwidth, the quality of the motion video image can be compromised significantly.

The format of H.263 encoded digital video signals is known and is described more completely in "ITU-T H.263: Line Transmission of Non-Telephone Signals, Video Coding for Low Bitrate Communication" (hereinafter "ITU-T Recommendation H.263"), incorporated by reference herein in its entirety. Briefly, in H.263 and other encoded video signal standards, a digital motion video image signal, which is sometimes called a video stream, is organized hierarchically into groups of pictures, which include one or more frames, each of which represents a single image of a sequence of images of the video stream. Each frame includes a number of macroblocks that define respective portions of the video image of the frame. An I-frame is encoded independently of all other frames and therefore represents an image of the sequence of images of the video stream without reference to other frames. P-frames are motion-compensated frames and are therefore encoded in a manner that is dependent upon other frames. Specifically, a P-frame is a predictively motion-compensated frame and depends only upon one I-frame or, alternatively, another P-frame which precedes the P-frame in the sequence of frames of the video image. The H.263 standard also describes BP-frames, however, for the purposes of description herein, a BP-frame is treated as a P-frame.

All frames are compressed by reducing redundancy of image data within a single frame. Motion-compensated frames are further compressed by reducing redundancy of image data within a sequence of frames. Since a motion video signal includes a sequence of images, which differ from one another only incrementally, significant compression can be realized by encoding a number of frames as motion-compensated frames, i.e., as P-frames. However, errors from noise introduced into the motion video signal or artifacts from encoding of the motion video signal can be perpetuated from one P-frame to the next and therefore persist as a rather annoying artifact of the rendered motion video image. It is therefore desirable to periodically send an I-frame to eliminate any such errors or artifacts. Conversely, I-frames require many times more bandwidth, e.g., on the order of ten times more bandwidth, than P-frames, so encoding I-frames too frequently consumes more bandwidth than necessary. Accordingly, determining when to include an I-frame, rather than a P-frame, in an encoded video stream is an important consideration when maximizing video image quality without exceeding available bandwidth.

Another important consideration when maximizing video image quality within limited signal bandwidth is the compromise between image quality of and bandwidth consumed by the encoded video signal as represented by an encoding parameter $\lambda$. In encoding a video signal, a particular value of encoding parameter $\lambda$ is selected as a representation of a specific compromise between image detail and the degree of compression achieved. In general, a greater degree of compression is achieved by sacrificing image detail, and image detail is enhanced by sacrificing the degree of achievable compression of the video signal. In the encoding standard H.263, a quantization parameter Q effects such a compromise between image quality and consumed bandwidth by controlling a quantization step size during quantization in an encoding process.

However, a particular value of encoding parameter $\lambda$ that is appropriate for one motion video signal can be entirely inappropriate for a different motion video signal. For example, motion video signals representing a video image which changes only slightly over time, such as a news broadcast (generally referred to as "talking heads"), can be represented by relatively small P-Patent frames since successive frames differ relatively little. As a result, each frame can include greater detail at the expense of less compression of each frame. Conversely, motion video signals representing a video image that changes significantly over time, such as fast motion sporting events, require larger P-frames since successive frames differ considerably. Accordingly, each frame requires greater compression at the expense of image detail.

Determining an optimum value of encoding parameter $\lambda$ for a particular motion video signal can be particularly difficult. Such is especially true for some motion video signals, which include both periods of little motion and periods of significant motion. For example, in a motion video signal representing a football game includes periods where both teams are stationary awaiting the snap of the football from the center to the quarterback and periods of sudden extreme motion. Selecting a value of encoding parameter λ which is too high results in sufficient compression that frames are not lost during high motion periods but also in unnecessarily poor image quality during periods were players are stationary or moving slowly between plays.

Conversely, selecting a value of encoding parameter λ that is too low results in better image quality during periods of low motion but likely results in loss of frames due to exceeded available bandwidth during high motion periods.

A third factor in selecting a balance between motion video image quality and conserving available bandwidth is the frame rate of the motion video signal. A higher frame rate, i.e., more frames per second, provides an appearance of smoother motion and a higher quality video image. At the same time, sending more frames in a given period of time consumes more of the available bandwidth. Conversely, a lower frame rate, i.e., fewer frames per second, consumes less of the available bandwidth but provides a motion video signal which is more difficult for the viewer to perceive as motion between frames and, below some threshold, the motion video image is perceived as a "slide show," i.e., a sequence of discrete, stilted, photographic images. However, intermittent loss of frames resulting from exceeding the available threshold as a result of using an excessively high frame rate provides a "jerky" motion video image which is more annoying to viewers than a regular, albeit low, frame rate.

I-frame placement and encoding parameter λ value selection combine to represent a compromise between motion video image quality and conservation of available bandwidth. However, to date, conventional motion video encoders have failed to provide satisfactory motion video image quality within the available bandwidth.

These shortcomings discussed above have significantly reduced the quality and effectiveness of audio/visual Internet transmissions and prevented the widespread application of these technologies. Accordingly, it would be desirable to have systems and methods that allow for high quality two-way transmission of audio and video signals while minimizing bandwidth usage.

Presently, many shortcomings are apparent with current video-conferencing technologies such as Microsoft's Net Meeting®. This program requires the consumer to go to a site, download the software that has an estimated time of one hour at average connect speed via analog modem. Then one must follow a series of steps while having to double click and provide technical information about their system, about their method of connection, and where they wish to connect. Upon connecting, they will have to establish a room, share that room's address and password/user names with the conference, and then engage in the conferencing. This is all assuming that the two can coordinate their effort using the same platform.

If successful, at best the conference has a mediocre to low quality video and almost irritating, unfiltered audio, with echoing tendencies that is limited to 1 viewer and 1 producer. Moreover, the software is limited solely to video-conferencing use. In addition, if the consumer has no microphone/camera, they cannot utilize the software. Finally, the session occurs with no regulation or control/direction.

Another area that has suffered as a result of the shortcomings inherent in present audio and visual transmission technologies is the field of online education. Presently, only a few universities are using online education in a limited capacity. Duke University, for example has Masters in Business Administration (MBA) Program that is exclusively online. The University of Phoenix also is using online education. However, at the moment, previously taped "non-interactive" video lectures are all that can be viewed by the students. Homework assignments can be downloaded of the school website, prepared by the student and then emailed to the professor. Students can also enter chartrooms and ask questions from their professors.

Unfortunately, this is the only method by which online education exists today. Although there are many benefits to on line education and the institutions implementing this current system have had a great response, they are obsolete because of the lack of student/teacher interactions.

Such a technological improvement would also prove advantageous in the field of airline security. The FAA, following the terrorist attacks of Sep. 11, 2001 has requested for security methods or systems that would enable viewing the cockpit and the interior of the fuselage of an aircraft in "real time" by multiple government agencies simultaneously.

From the above, it can be seen that there is a great need for a high quality and high speed means of providing interactive audio and video transmission between remote locations. As explained below, the present invention solves this need as well as other shortcomings of prior systems.

SUMMARY OF THE INVENTION

The present invention comprises systems and methods for browser-based digital video broadcasting coupled with interactive voice/text communication.

A preferred method of providing one-way video transmission and corresponding interactive two-audio communication to remote recipients accessing the Internet via a world wide computer network comprising the steps of (a) creating at a source location a source digital video signal corresponding to a viewed scene, (b) broadcast transmitting the source digital video signal at substantially the same time the source digital video signal is created, wherein the source digital video signal is transmitted through a one-way dedicated transmission channel to at least one recipient via an internet connection. The method further includes the steps of (c) transmitting a source digital audio signal created at a source location and corresponding to the source digital video signal to the at least one recipient over an Internet connection via a VoIP protocol, and (d) transmitting a recipient audio signal created at a recipient location and responsive to the source audio signal or the source video signal, wherein the source audio signal is transmitted from the recipient location to the source location via an Internet connection.

Alternate methods may also be employed, including the additional step of (e) creating at a recipient location a recipient digital video signal corresponding to a viewed scene, (b) broadcast transmitting the recipient digital video signal at substantially the same time the recipient digital video signal is created and the recipient audio signal is transmitted, wherein the recipient digital video signal is transmitted through a one-way dedicated transmission channel to the source location via an internet connection.

Other applications of the methods of the present invention include retailer, video-conferencing, educational, adult entertainment, and airline security applications.

A preferred system for broadcast transmitting a one-way digital video signal and for transmitting and receiving a corresponding interactive two-way audio signal to a remote recipient via an Internet connection comprises (a) a camera for creating a source digital video signal corresponding to a viewed scene, and (b) a broadcast digital video server for broadcast transmitting the source digital video signal created by the camera, wherein the broadcast digital video server configured to transmit the source digital video signal substantially simultaneously with its creation via a one-way dedicated transmission channel to at least one recipient via an internet connection. Other components of the system include (c) a digital audio encoding device for creating a source digital audio signal at a source location corresponding to the source digital video signal created by the camera, (d) a VoIP audio server for transmitting the source digital audio signal created by the digital audio encoding device to the at least one recipient over an Internet connection via a VoIP protocol. Additionally the system requires (e) an Internet web page accessible by the remote recipient and configured to display the transmitted source digital video signal and to play the source digital audio signal, wherein the internet web page is further configured to receive a recipient digital audio signal from the recipient responsive to the source digital audio signal and to transmit the recipient digital audio signal to the VoIP audio server at the source location. Also, the VoIP audio server is configured to receive and play the recipient digital audio signal.

Additional embodiments of the claimed system include a second video server for providing a responsive video signal from the recipient so as to enable two-way video transmission. Further refinements to the system can include the use of additional software and hardware components to enable moderated or unmoderated interactive two-way digital audio, two-way text, and one- or two-way digital video transmission.

DETAILED DESCRIPTION OF THE FIGURES

Figure 1:
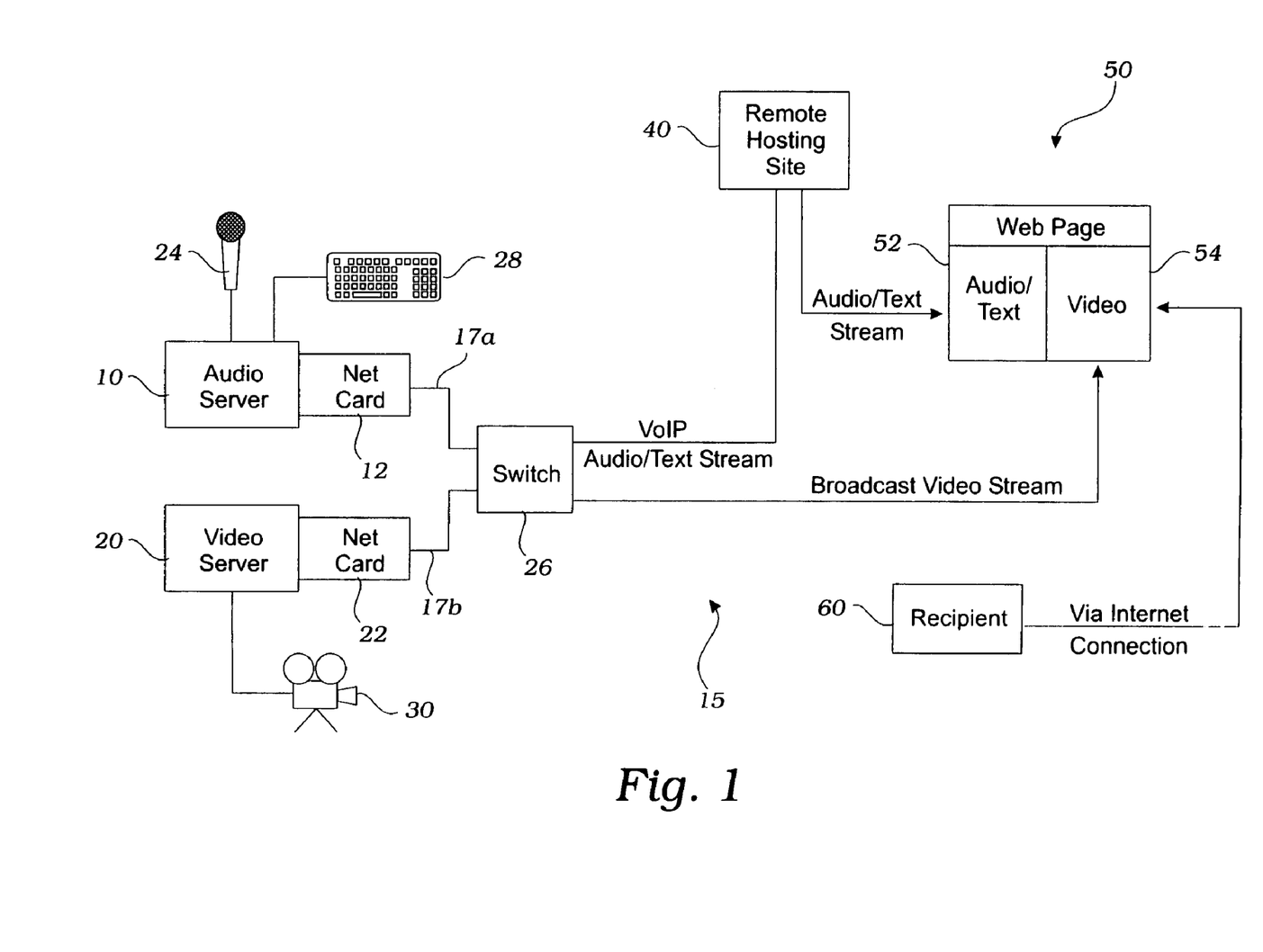
FIG. 1 is a graphical representation of a system of the present invention.

FIG. 1 shows one aspect of the present invention comprising a system for enabling one-way digital broadcast of video signals linked with interactive two-way audio, two-way text or two-way audio and text transmission via the Internet.

As discussed above, one problem of past systems has been that digitally broadcasting video signals via the Internet results in extremely high quality video images, but the corresponding audio quality has been extremely low. Further, broadcast audio does not allow interactive two-way communication between the sender and the recipient unless both send and receiver have a complex and expensive audio/video broadcast system. Even in this situation, however, synchronization of the two systems to allow two-way communication is difficult.

The present invention solves the problem of prior systems by eliminating entirely the audio signal from the broadcast audio/video signal, resulting in a broadcast signal of only video data. This is accomplished by setting the audio signal=0 in the coding of the one-way broadcast audio and video signal to eliminate the audio signal entirely. One collateral benefit of this is that it frees up broadcast resources originally used for the audio signal that may be then used for improving the quality of the broadcast video signal.

Instead of broadcast audio, the present invention transmits the audio signal concurrently with broadcast video signal using "voice over IP" or "VoIP" (that is, voice delivered using the Internet Protocol). VoIP is a term used in IP telephony for a set of facilities for managing the delivery of voice information using the Internet Protocol (IP). In general, this means sending voice information in digital form over the Internet in discrete packets rather than in the traditional circuit-committed protocols of the public switched telephone network (PSTN). VoIP, now used somewhat generally, derives from the VoIP Forum, an effort by major equipment providers, including Cisco, VocalTec, 3Com, and Netspeak to promote the use of ITU-T H.323, incorporated herein by reference in its entirety, the standard for sending voice (audio) and video using IP on the public Internet and within an intranet. The VoIP protocol is discussed more fully in a white paper located at http://www.erlang.com/protocols.html, incorporated by reference in its entirety.

In addition to IP, VoIP uses the real-time protocol (RTP) to help ensure that packets get delivered in a timely way. More timely service is also possible with private networks managed by an enterprise or by an Internet telephony service provider (ITSP). A technique used by at least one equipment manufacturer, Netspeak, to help ensure faster packet delivery is to Packet Internet or Inter-Network Groper (ping) all possible network gateway computers that have access to the public network and choose the fastest path before establishing a Transmission Control Protocol (TCP) sockets connection with the other end.

By transmitting the audio signal using VoIP, two-way transmission of audio between the source and the recipient is possible because the outgoing audio signal from the source is necessarily synchronized with any incoming audio signal from the recipient. In this way, a conversation may be maintained between the source location and the recipient of the information using audio transmitted via VoIP. In addition, the recipient also receives high quality real-time video images from the source via the broadcast digital video signal transmission.

It is important to note that although VoIP is one of the easiest methods to produce the audio stream, other known technologies for digital audio could also be used without departing from the scope of the invention. The important aspect that creates a manifold increase in speed and quality is that that digital broadcast video and digital two-way audio run in separate but substantially concurrent data paths between the source and a remote recipient.

As shown in FIG. 1, a system 15 for providing digital broadcast video coupled with VoIP audio comprises a broadcast digital video server 20, a VoIP digital audio server 10, and a transmitting switch 26. Also included is a video camera 30 (preferably digital) for providing digital video information to the broadcast video server 20. The broadcast digital video server 20 is preferably an IBM Compatible custom-made machine, and includes video-encoding software such as Windows® Media Encoder® 7.0 available from Microsoft® of Redmond, Wash. The broadcast digital video server can also include other video encoding software such as Real Producer® and/or Apple® QuickTime® to allow cross compatibility between the common IBM® and Apple® operating systems.

Figure 2:
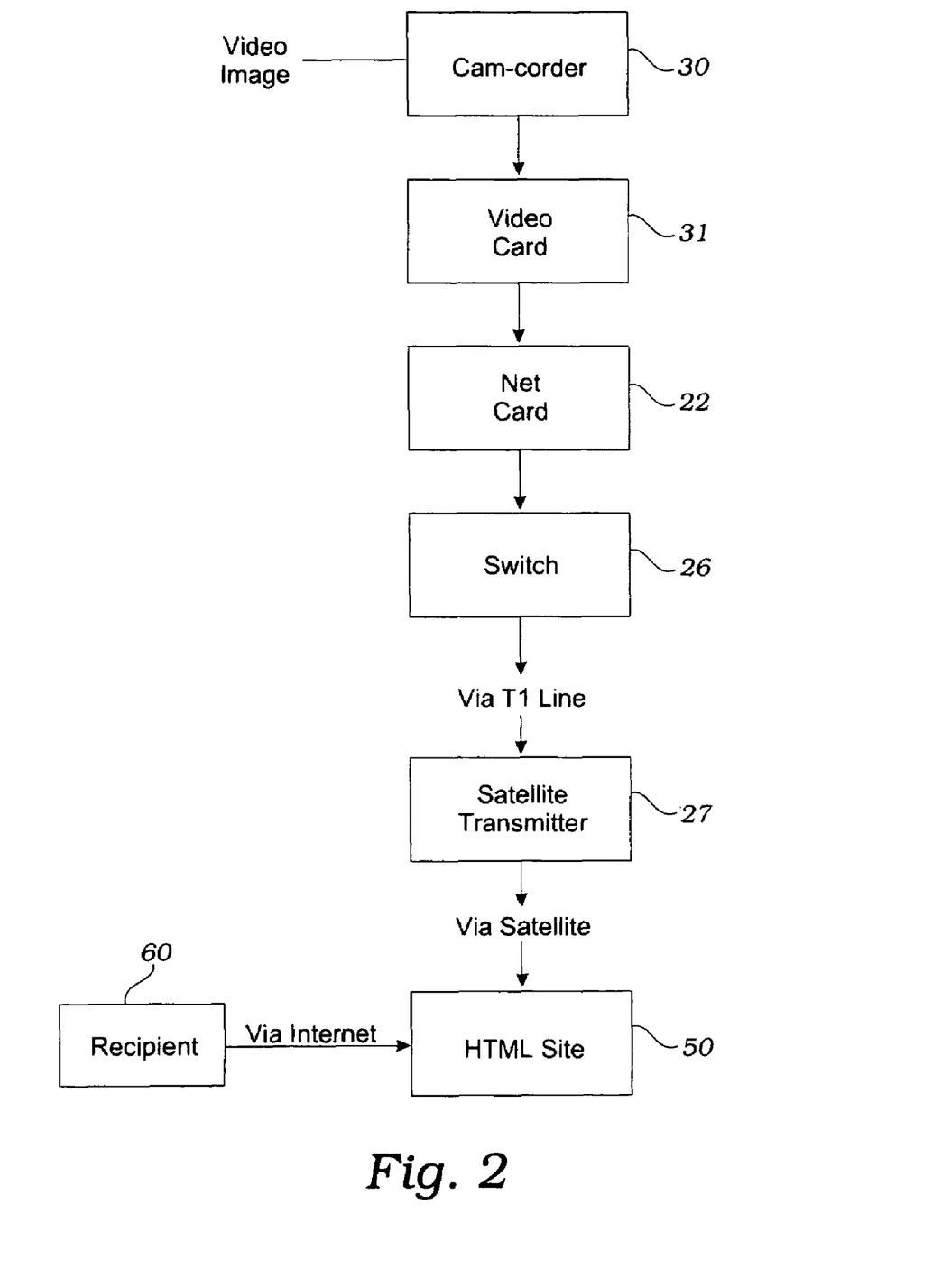
FIG. 2 is a graphical representation showing the steps of a method of transmitting digital video to a remote user.

In a preferred configuration, the broadcast digital video server 20 comprises a CPU including an Osprey 500 DV card 31 (shown in FIG. 2), 3 Gigabytes of SDRAM, dual Zeon Pentium 2 GigaHertz processors and motherboards, and preferably a Small Computer System Interface (SCSI) Low Voltage Differential (LVD) Hard Drive running at 15000 rpm and having an 8 MB buffer. In a preferred configuration, the broadcast digital video server 20 also includes Windows 2000® professional server software to allow the server 20 to make use of the dual processors. A preferred embodiment of the broadcast video server 20 also includes a 10×100 Ethernet Card 22. Importantly, the video broadcast settings/quality of the broadcast digital video server 20, which is normally set to 28.8-100 Kbps, are modified so that the required audio component is set to 0 Kbps.

Figure 3:
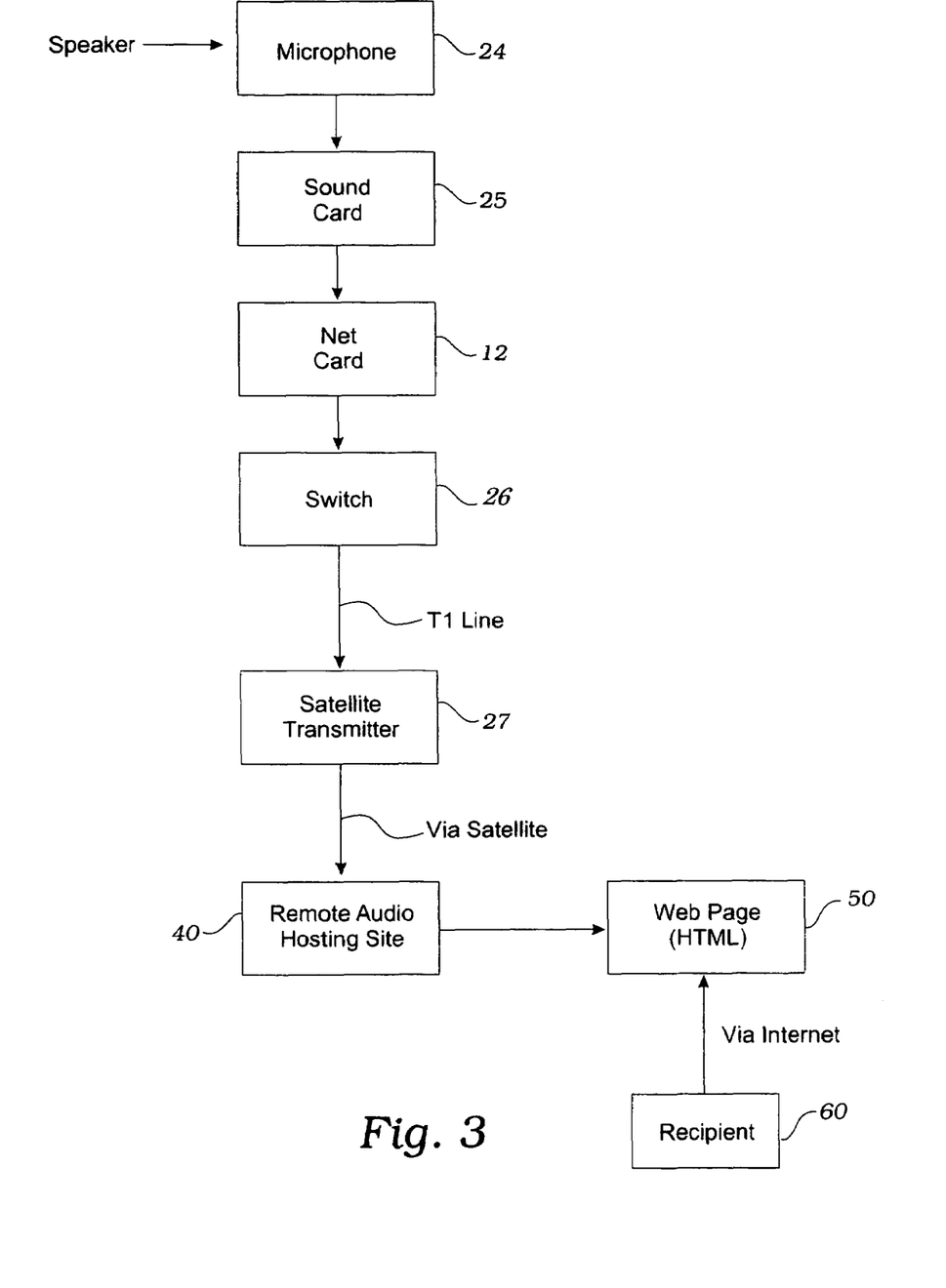
FIG. 3 is a graphical representation showing the steps of a method of interactive two-way communication between a source and a remote user.

In contrast, a preferred embodiment of the VoIP digital audio server 10 may be similarly configured to the broadcast video server 20 except that in the VoIP audio server 10, the Osprey 500 DV video card 31 is preferably replaced with a SoundBlaster® 512 PCI sound card 25 (shown in FIG. 3). Also, wherein the broadcast video server 20 includes inputs for digital video data from the digital video camera 30, the VoIP audio server includes a microphone 24 and associated system for digitizing the audio signal from the source. The VoIP digital audio server may include a keyboard 28 that allows for interactive text communication between the remote user and the source. If the keyboard is used, the system will produce a combined audio and text signal. Alternatively, for systems for which two-way audio communication is not possible or desirable (e.g., the remote user is not configured for outgoing audio transmission), text-only transmission is also possible as is 1-way text coupled with 1-way audio. Thus, the disclosed VoIP audio server is capable of creating and transmitting audio-only, audio/text, and text-only data streams.

For purposes of this discussion, however, the system will be described principally with reference to a VoIP two-way audio-only transmission. Normally, the average user is restricted to approximately 53 KB of bandwidth. This constricts the potential for simultaneous interlaced audio and video streams. By splitting the audio and video signal between two servers in a preferred system, the bandwidth restrictions found in prior systems is nullified because both streams individually can be separately compressed using standard data compression techniques. This separation and individual compression can result in video viewing speeds at a minimum of 15 to 30 frames-per-seconds and also concurrently communicating via VoIP digital audio.

Additionally, the broadcast digital video server 20 and the VoIP audio server 10 preferably include about 4 gigs of RAM each. Both server hard drives are also preferably encased within a mounted cooling fan slot, to prevent blue screen errors. Experience has shown that massive cooling improves the stability of the system.

In a preferred embodiment, both servers 10, 20 may also include remote operational software such as, for example, Lap Link Gold, to allow a system administrator control of both servers at all times.

Importantly, it should be understood that, although with the present technology it has been found that dual servers provide the best reliability with respect to broadcast video and VoIP transmission, a single server could also be configured to provide both audio and video streams without departing from the scope or spirit of the invention. But as this alternative configuration is easily understood by one of skill in the art in light of the teachings herein, the remaining discussion will focus on the presently preferred two-server configuration.

Both servers 10, 20 are preferably coupled to the switch 26 using category five cables 17a, 17b as is known in the art. In this manner, the audio feed from the VoIP audio server 10 and the video feed from the broadcast digital video server 20 are carried via the cables 17a, 17b from the respective Ethernet cards 12, 22 to a switch 26 (preferably a 1 gig Net gear switch). This switch 26 can be configured to assign a designated IP address for both servers 10, 20. The switch is connected to an Internet connection such as a "T1" or "DS1" line.

In a preferred embodiment, both servers are supported by multiple "DS1" lines wherein DS1, the signal in the T-1 carrier, is 24 DS0 (64 Kbps) signals transmitted using pulse-code modulation (PCM) and time-division multiplexing (TDM).

The switch 26 then sends the respective broadcast video and VoIP audio signal feeds at a bitrate of about 100-1000 Mbytes/s via the DS1 or DS3 line to, for example, a satellite transmitting station 27 or other well known means of accessing the Internet.

Broadcast Video Transmission

With respect to the video signal feed, the video signal is sent directly to a requesting HTML web site 50 which then loads and visually displays the broadcast digital video signal via the computer monitor of the requesting recipient 60. The manner of accessing the site 50 and requesting the video signal utilized by the recipient 60 will be described shortly. In short though, this video signal is activated by the recipient 60 such that it begins to run on the recipient's computer when the recipient 60 clicks or accesses a static IP address corresponding to the video signal that is embedded in the Internet source page created by the video server 20.

In a preferred embodiment, the recipient 60 is directed to a web page via, for example, a link having an embedded URL that will relocate the user to the web page. This page can consist of 3 individual frames that are all within the same window. The top frame can include location information informing the recipient of the information accessible through the page, while the bottom left and right framers are reserved for the audio and video streams. Both streams are activated automatically for the there exists a java based auto executing apparatus within the html, the recalls the server end ip address to both streams. Once the streams are identified, and the users setting are defined, the system begins to "shoot." In order to view the broadcast digital video signal, the recipient 60 must have some sort of video player component installed, such as Windows® Media Player®. Video player components generally come as a standard software package that is included in nearly all off-the-shelf personal computer systems, and most of all the older systems as well, and can also be downloaded from a variety of Internet sources.

In a preferred system, if the recipient 60 does not have all the required components to properly display the video signal, the HTML can be configured to display a link to have the appropriate video player software automatically installed onto the recipient's system from a site hosting the necessary components. Preferably, the system is configured to take advantage of already pre-installed codes that are included in the recipient's 60 computer operating system. This will enable the recipient 60 to view a live video stream from a remote source and to communicate with the remote source via digital two-way audio with minimal to no installation of any third-party software.

In a preferred system, prior to providing the broadcast digital video signal from the broadcast digital video server 20, the server 20 first determines the connection speed that the recipient has to the Internet (usually from 28.8-100 Kbps on current systems) and delivers the appropriate medium in Broadcast quality. For example, the server 20 can include a motion video signal encoder to maximize image quality without exceeding transmission bandwidth available to carry the encoded motion video signal. This is accomplished by comparing encoded frames of the motion video signal to a desired size of frame at the destination HTML being accessed by the recipient 60. If the size of encoded frames differ from the desired size, encoding is adjusted to produce encoded frames closer in size to the desired size. Basically the users bandwidth will define what format of video the user shall receive in terms of pixel width and length. It will also determine the variance level between 15-30 frames per second.

In addition, a preferred broadcast digital video server 20 can include a cumulative bandwidth error to determine the accumulated amount of available bandwidth. The cumulative bandwidth error is adjusted as time elapses to add to the available bandwidth and as each frame is encoded to completely consume available bandwidth. As the cumulative bandwidth error grows in magnitude above or below zero, encoding is adjusted as needed to either improve image quality to more completely consume available bandwidth or to reduce image quality to thereby consume less bandwidth and to cause the cumulative bandwidth error to move toward zero. Rapid changes in the amount of change or motion in the motion video signal are detected by comparing the amount of change between two consecutive frames and filtering the amount of change with previously measured amounts of change. Encoding is pre-compensated according to the filtered measurement of rapid change. It is important to note that if this system should be applied via Internet, the system can only increase its performance over time, with the emplacement and advancement of the physical lines that make the Internet function.

Thus, compensating image quality and size guarantees that the image produced will be of optimal quality considering the limitations imposed on the system by the access speed utilized by the recipient 60. Recipients 60 having higher speed Internet connections thus receive a higher quality and larger video display window than would a slower speed recipient 60 who may receive a still high quality video signal, although displayed in a smaller window.

VoIP Audio Transmission

With respect to the VoIP audio signal, the VoIP audio server is configured such that it directs the VoIP audio signal to a remote-hosting site 40. In a preferred embodiment, the audio chat is hosted by a voice chat server. Any voice chat server can be used but preferably it supports digital audio transmission and permits on-demand installation. In a system constructed by the inventors, the audio chat server is located at "Telco Point" in Dallas, Tex. The VoIP stream is directed to the remote hosting site 40 in order to provide the necessary speed and bandwidth required for two-way communication.

Thus, the video stream is bound to the outgoing Ds(x) line that is connected to the video server 20 and is limited by the performance possible from the server 20 and Ds(x) line. The audio stream, however, is picked up by an off-location remote-hosting site 40. In a preferred embodiment, the audio chat is hosted by a voice chat server and boosted in terms of bandwidth to a separate IP address.

As described above, the hosting site 40 includes a multi-frame HTML that provides the window for the audio, text, or audio and text chat. The HTML created by the Internet host site includes an IP address designated for the audio chat. The IP address is an embedded framework audio and text address for accessing the host site. All the frames are located within the users same widow and browser all within the same session.

The VoIP Audio/Broadcast Video System Interface

It is expected that the one-way video broadcast and accompanying two-way audio/text chat will be initiated by the remote user/recipient 60 in most circumstances. In such a situation the recipient 60 accesses a web page using an ordinary computer, preferably equipped with a microphone. Upon accessing the web page, the recipient 60 activates an HTML link, which directs the recipient to an Internet host page, which may be divided into two portions. The first portion controls the audio portion of the transmission between the source location and the recipient 60. The IP address for the VoIP audio server may be automatically called to allow the recipient 60 full access to the audio/text portion of the transmission.

The second portion of the host page controls the broadcast transmission of the digital video signal and will include the IP Address for the broadcast digital video server, which may be automatically called as well. As discussed above, the broadcast digital video server is preferably configured such that it will configure itself automatically depending on the configuration of the recipient's system, most particularly the bandwidth of the recipient's Internet connection.

Because of hardware, software, and system limitations inherent in an Internet based transmission of video signals, the video and audio signal feeds may not be received by the recipient 60 simultaneously. Particularly, the video portion of the transmission will generally be received some matter of seconds after the corresponding audio portion of the transmission. Generally, this delay has been below ten seconds and it is anticipated that this delay can be limited and even eliminated as video transmission technologies are developed and/or improve. Although it is also possible that the corresponding audio stream can be delayed to arrive simultaneously with the video stream, this would significantly impact the flow and timing of the resultant two-way communication, making it an undesirable solution in most circumstances.

With respect to security, the servers can also include a 128-bit encryption module, and appropriate passwords and access may be given to all administrators and/or users required.

System Applications

The present invention is well suited for a number of varied applications. As can be appreciated, the well-known "video conference" is one application well suited for application of the present invention. Also, for two-way video conferencing (as with all the applications described herein), both the source and the recipient 60 may be equipped with a full system to include a broadcast video stream from the recipient 60.

Another obvious application is for retail sale and/or support of products via the Internet. In such a configuration, the remote user or recipient 60 is a potential customer and the VoIP and broadcast digital video feeds are initiated through embedded IP links placed on a retailer's web page, and are accessed via predetermined URL settings.

For example, a customer may wish information about a certain product, perhaps for purposes of buying the product, or using or repairing that product. The customer would be directed to a specific page on the retailer's site that contains links for customer service personnel prepared to deal with the customer's inquiry. For this purpose, a customer service representative is provided with a video camera that provides the video feed of the representative and/or the product of interest and a microphone for providing the outgoing portion of the two-way VoIP audio stream. Thus, the representative would provide the source video and audio stream. In this manner, the representative can initiate audio communication with the customer as well as a high-quality video demonstration of the product, including product operation, features, trouble-shooting, and repairs.

In one embodiment of a system particularly suited for retail sales, upon clicking on a referring link on the retailer's site, the customer is directed to a frame-in-frame Internet page. The frame-in-frame page is an HTML having an outer frame linked to the retailer's IP address, thus displaying the retail page. Below and or within the retailer's page is a second frame linked to a second monitoring host site. Such a configuration would allow for the collection and monitoring of access and performance statistics for the use and control of the VoIP audio server 10 and broadcast digital video server 20. For this model, real time statistics may be provided via a network monitoring system such as an Ether peak device or the Log Analyzer® Web Trends® software available from NetIQ®, located in San Jose, Calif. These statistics are preferably available to the administrator and the retailer as they are produced.

The referring link that the customer follows may be configured to access a "chat room" that is moderated by the customer representative that is presenting information on the retail product of interest to the customer. Thus, all customers accessing the chat room are exposed to the same video feed from the representative and may also engage in two-way audio and/or text communication with the representative/moderator.

To effectively moderate the presentation to the customers, the system will prompt each customer for a user name and the customer will then be placed in a queue. This queue may be manipulated by the representative/moderator to open the audio feed between a specific customer (or customers) and the moderator/retailer while the remaining customers in the chat room are able to listen in on both ends of the two-way VoIP audio communication and watch the broadcast digital video feed. In this manner, customer inquiries, questions, and comments can be handled in a logical and measured way. As discussed above, both the VoIP audio server 10 and broadcast digital video server 20 may also include remote operational software such as, for example, Lap Link Gold®, to allow the representative/moderator control over the customer queue and the ability to moderate the online chat. Preferably, the chat room is also configured to allow all customers to communicate either publicly or privately via text messaging both with each other and with the representative. This text messaging capability is provided in addition to or in substitution to the audio component. The system may also be configured for private VoIP communication between the customers or between a customer and the moderator.

Other models include online education where the representative/moderator is a professor, teacher or instructor, and the customer is a student. In this manner, the "chat room" is an online classroom with both a high-quality broadcast video transmission of the professor and interactive private and/or public two-way VoIP audio and/or text transmission capability between the professor and the students.

Alternatively, the system is well suited for entertainment, wherein the moderator is an entertainer providing both a one-way video feed to the customer and two-way VoIP audio and/or text transmission capability between the entertainer and the customer.

In another embodiment, the system may be installed on an airplane. In this configuration, video and audio from the plane are transmitted as explained above to, for example, the airline's ground-based flight control center. Such a system provides the added benefit of preserving both video and audio data in the event of a catastrophic accident that would destroy or make unavailable the so-called "black box". Additionally, flight data that was traditionally collected by the on-plane black box may also be sent to the ground-based flight control center for collection and preservation. In the event of a security situation or in-flight malfunctions, the video and audio link between the flight control center and the airplane may prove particularly useful in providing information, instruction and assistance to the flight crew to resolve the situation.

Video and/or audio information from the airplane cabin may also be monitored and/or analyzed by authorities either in real-time or after an incident in order to determine security problems, plane malfunctions, or crew member or passenger conduct. Coupled with face- and voice-recognition technologies, the video and/or audio feed from the plane may be monitored from the ground while the plane is in-flight or still on the ground to determine whether a known terrorist or security risk is on a plane. A warning may then be given to the flight crew to neutralize the threat or ground based security may go into action. Such a system is far desirable to proposed systems that would be based in the airport terminal itself because the faces of the passengers are generally turned in one direction and at one angle and are normally stationary for a considerable amount of time. Also, extraneous non-threats (i.e., airport workers, non-flying airport visitors) are eliminated from the pool of potential suspects that must be reviewed for potential matches.

Thus, multiple simultaneous viewers can have a combined video/audio and text from a single source spread to multiple and unlimited sources. Therefore, air-traffic control, the NTSB (National Transportation Safety Board) and the FBI (Federal Bureau of Investigations) can have direct contact with the aircraft's pilot. The pilots can always be in contact via a 3-trier system will all parties involved in the monitoring of the aircraft. The 3-trier communication includes; visual, verbal, and text at real time for both ends, scalable to any bandwidth, which is made available on the fly (with no extensive downloading).

Also, given the fact that the airlines have a telephone capability entitled "air phone" and have access to conveniences such as live stock quotes from the Internet, it can transmit through this medium, since the technology is scalable to various bandwidths.

From the foregoing, it will be appreciated that although embodiments of the invention have been described herein for purposes of illustration, various modifications may be made without deviating from the spirit of the invention. It can also be understood by one of ordinary skill in the art that specific details of any embodiment herein described can be interchanged with or applied to the teachings of any other embodiment. Thus, the present invention is not limited to the embodiments described herein, but rather is defined by the claims that follow.

I claim:

1. A method of providing one-way video transmission and corresponding interactive audio communication to remote recipients accessing a computer network, the method comprising the steps of:
   a) creating at a video source location a source digital video signal corresponding to a viewed scene;
   b) broadcast transmitting the source digital video signal at substantially the same time the source digital video signal is created, wherein the source digital video signal is transmitted through a one-way transmission channel for carrying a signal with only video content to at least one remote recipient via a network connection, wherein said at least one remote recipient accesses the video content using a first graphical user interface to play the video content;

c) transmitting, in a channel separate from the transmission channel for video content, a source digital audio signal created at a audio source location and corresponding to the source digital video signal to a remote hosting site over a network connection via a VoIP protocol, wherein the source digital audio signal is transmitted on a channel separate from the one-way transmission channel, wherein the one-way transmission channel carrying the source digital video signal is not handled by the remote hosting site, and wherein the at least one remote recipient accesses the remote hosting site using a second graphical user interface to access the source digital audio signal without the source digital video signal, wherein the first and second graphical user interfaces are integrated in a single graphical user interface by the at least one remote recipient; and d) transmitting a recipient audio signal created at a recipient location and responsive to the source audio signal or the source video signal, wherein the recipient audio signal is transmitted from the recipient location to the remote hosting site via a network connection, wherein the remote hosting site provides necessary speed and bandwidth required for audio communication but not video communication via the one-way channel.

2. The method of claim 1, further comprising the source digital video signal being activated when the at least one recipient accesses an IP address corresponding to the web page the source digital video signal.

3. The method of claim 1, wherein the source location of the source digital video signal and the source location of the source digital audio signal comprise two separate servers.

4. The method of claim 3, wherein the two separate servers each have an assigned IP address.

5. The method of claim 3, wherein the source digital video signal is embedded in a network source page created by the server associated with the source digital video signal.

6. The method of claim 1, wherein the remote hosting site comprises a voice chat server.

7. The method of claim 1, wherein the video content and the audio are separately accessible from the computer network by the recipient.

8. The method of claim 7, wherein the video content and the audio are separately accessible from the computer network by the recipient using separate IP addresses, in which one of the IP addresses is directed at the audio intermediate site to access the audio.

9. The method of claim 1, wherein the remote hosting site provides the necessary speed and bandwidth required for audio communication.

10. The method of claim 9, wherein the remote hosting site is associated with a server separate from the source.

11. The method of claim 10, wherein the remote hosting site comprises a web site.

12. The method of claim 1, wherein the first and second graphical user interfaces are integrated in a single graphical user interface that can be used to access audio and video content.

13. The method of claim 12, wherein the graphical user interface comprises a browser.

14. The method of claim 1, wherein the video content is transmitted substantially live.

15. The method of claim 1, wherein the video content is transmitted from the source.

16. The method of claim 1, wherein the video content is broadcast to multiple recipients.

17. A system for broadcast transmitting a one-way digital video signal and for transmitting and receiving a corresponding interactive audio signal to a remote recipient via a network connection, the system comprising:

a) a camera for creating a source digital video signal corresponding to a viewed scene;

b) a broadcast digital video server for broadcast transmitting the source digital video signal created by the camera, the broadcast digital video server configured to transmit the source digital video signal substantially simultaneously with its creation via a one-way transmission channel for carrying a signal with only video content to the remote recipient via a network connection;

c) a digital audio encoding device for creating a source digital audio signal at a source location corresponding to the source digital video signal created by the camera;

d) a VoIP audio server for transmitting the source digital audio signal created by the digital audio encoding device to the remote recipient over a network connection via a VoIP protocol, wherein the source digital audio signal is transmitted to a remote hosting server on a channel separate from the one-way transmission channel for transmitting the source digital video signal, and wherein the one-way transmission channel carrying the source digital video signal is not handled by the remote hosting server;

e) a web page accessible by the remote recipient and configured to display the transmitted source digital video signal and to play the source digital audio signal without the source video signal at the remote hosting server; and f) the web page further configured to be accessible by the remote recipient to receive a recipient digital audio signal from the remote recipient responsive to an activation of a link in the web pane by the remote recipient, and to be accessible by the remote recipient to transmit the recipient digital audio signal via the remote hosting server to the VoIP audio server at the source location, the VoIP audio server further configured to receive and play the recipient digital audio signal, wherein the remote hosting site provides necessary speed and bandwidth required for audio communication but not video communication via the one-way transmission channel.

18. A system for broadcast transmitting a digital video signal and a digital audio signal, comprising:

a) a source video device creating a source digital video signal corresponding to a viewed scene at a source location;

b) a broadcast device broadcast transmitting the source digital video signal through a one-way dedicated transmission channel to at least one recipient via a network connection, wherein a cumulative bandwidth error determines the accumulated amount of available bandwidth for transmitting the source digital video signal and is adjusted to increase the available bandwidth, wherein said at least one recipient accesses video content represented by the source digital video signal using a first graphical user interface to play the video content;

c) a source audio device transmitting a source digital audio signal created at a source location and corresponding to the source digital video signal to a remote hosting server over a network connection via a VoIP protocol, wherein the one-way dedicated transmission channel carrying the source digital video signal is not handled by the remote hosting server, and wherein the remote hosting server is configured to permit access of the source digital audio signal without the source digital video signal by said at least one recipient using a second graphical user interface; and d) a recipient device transmitting a recipient audio signal created at a recipient location and responsive to the source audio signal or the source video signal, wherein the source audio signal is transmitted from the recipient location to the remote hosting site via a network connection, wherein the remote hosting site provides necessary speed and bandwidth required for audio communication but not video communication via the one-way transmission channel, wherein the first and second graphical user interfaces are integrated in a single graphical user interface that can be used to access audio and video content.

* * * * *